US009749185B2

(12) United States Patent
Walton et al.

(10) Patent No.: US 9,749,185 B2
(45) Date of Patent: *Aug. 29, 2017

(54) METHODS AND SYSTEMS FOR EXPLOITATION OF WELL-CONNECTED NODES IN PEER-TO-PEER WIRELESS NETWORKS

(71) Applicant: QUALCOMM Incorporated, San Diego, CA (US)

(72) Inventors: J. Rodney Walton, Carlisle, MA (US); John W Ketchum, Harvard, MA (US); Oliver Michaelis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/560,667

(22) Filed: Dec. 4, 2014

(65) Prior Publication Data

US 2015/0085751 A1  Mar. 26, 2015

Related U.S. Application Data

(63) Continuation of application No. 12/575,465, filed on Oct. 7, 2009, now Pat. No. 8,934,462.

(51) Int. Cl.
*H04L 12/24* (2006.01)
*H04L 12/725* (2013.01)
(Continued)

(52) U.S. Cl.
CPC ............ *H04L 41/12* (2013.01); *H04L 45/306* (2013.01); *H04L 45/64* (2013.01); *H04L 67/104* (2013.01);
(Continued)

(58) Field of Classification Search
CPC ...... H04L 45/64; H04L 41/12; H04W 40/246; H04W 84/18
(Continued)

(56) References Cited

U.S. PATENT DOCUMENTS

| 7,039,701 B2 | 5/2006 | Wesley |
| 7,181,536 B2 | 2/2007 | Burbeck et al. |

(Continued)

FOREIGN PATENT DOCUMENTS

| CN | 1720678 A | 1/2006 |
| JP | 2008109614 A | 5/2008 |
| JP | 2009218811 A | 9/2009 |

OTHER PUBLICATIONS

Belle S. K, et al., "I Seek for Knowledge: Exploiting Social Properties in Mobile Ad Hoc Networks", Wireless Days, 2008, WD '08, 1st IFIP, IEEE, Piscataway, NJ, USA, Nov. 24, 2008 (Nov. 24, 2008), pp. 1-5, XP031448173.
(Continued)

*Primary Examiner* — Luat Phung
*Assistant Examiner* — Saad A Waqas
(74) *Attorney, Agent, or Firm* — Ashish L. Patel

(57) ABSTRACT

Certain embodiments of the present disclosure relate to methods for increasing a capacity in a peer-to-peer (P2P) wireless network. The methods include generating a connectivity metric (CM) value indicative of a number of other wireless nodes of the P2P wireless network to which the wireless node is connected, transmitting the CM value, and then transmitting full connectivity information maintained by the wireless node at a frequency determined based on the CM value. The disclosed methods therefore allow well-connected nodes of the P2P wireless network to be exploited in a manner that increases the overall connectivity of all the nodes in the network.

19 Claims, 5 Drawing Sheets

(51) Int. Cl.

| | | |
|---|---|---|
| *H04L 12/715* | (2013.01) | |
| *H04W 8/00* | (2009.01) | |
| *H04L 29/08* | (2006.01) | |
| *H04W 24/02* | (2009.01) | |
| *H04W 76/02* | (2009.01) | |
| *H04W 40/24* | (2009.01) | |
| *H04W 84/18* | (2009.01) | |

(52) U.S. Cl.
CPC ......... *H04L 67/1068* (2013.01); *H04W 8/005* (2013.01); *H04W 24/02* (2013.01); *H04W 76/021* (2013.01); *H04W 76/023* (2013.01); H04L 67/1072 (2013.01); H04W 40/246 (2013.01); H04W 84/18 (2013.01)

(58) Field of Classification Search
USPC ......................................................... 370/328
See application file for complete search history.

(56) References Cited

U.S. PATENT DOCUMENTS

| | | | |
|---|---|---|---|
| 7,266,085 | B2 * | 9/2007 | Stine .............................. 370/252 |
| 7,336,623 | B2 | 2/2008 | Huitema |
| 7,466,810 | B1 | 12/2008 | Quon et al. |
| 7,580,382 | B1 * | 8/2009 | Amis et al. ................... 370/310 |
| 7,680,068 | B1 | 3/2010 | Bouis |
| 8,116,247 | B2 | 2/2012 | Dixit et al. |
| 8,279,766 | B2 | 10/2012 | Tsang et al. |
| 8,904,015 | B2 | 12/2014 | Hopkins |
| 2003/0179742 | A1 | 9/2003 | Ogier et al. |
| 2006/0230107 | A1 | 10/2006 | Yu et al. |
| 2009/0016231 | A1 | 1/2009 | Li et al. |
| 2009/0016295 | A1 | 1/2009 | Li et al. |
| 2009/0034491 | A1 * | 2/2009 | Adams et al. ................ 370/337 |
| 2009/0154343 | A1 | 6/2009 | Fitch et al. |
| 2011/0007656 | A1 | 1/2011 | He et al. |
| 2011/0080869 | A1 | 4/2011 | Walton et al. |
| 2015/0085703 | A1 | 3/2015 | Walton et al. |

OTHER PUBLICATIONS

Choi H.D., et al.,"An Enhanced Gnutella for Ad-Hoc Networks", Systems and Networks Communication, 2006, ICSNC '06, International Conference on, IEEE, Oct. 1, 2006 (Oct. 1, 2006), pp. 3-3, XP031033868.

Conti M., et al., "A Cross Layer Optimiztion of Gnutella for Mobile Ad hoc Network," MobiHoc 2005, May 25-27, 2005, pp. 12, Urbana Champaign, Illinois, USA.

Dimokas N., et al., "High performance, low complexity cooperative caching for Wireless Sensor Networks", World of Wireless, Mobile and Multimedia Networks&Workshops, 2009,W0WM0M 2009, IEEE International Symposium on A, IEEE, Piscataway, NJ, USA, Jun. 15, 2009, (Jun. 15, 2009), pp. 1-9, XP031543667, ISBN: 978-1-4244-4440-3.

European Search Report—EP12166158—Search Authority—The Hague—Jul. 4, 2012.

International Search Report and Written Opinion—PCT/US2010/051718—ISA/EPO—Jun. 21, 2011.

Taiwan Search Report—TW099134063—TIPO—Sep. 21, 2013.

* cited by examiner

METHODS AND SYSTEMS FOR EXPLOITATION OF WELL-CONNECTED NODES IN PEER-TO-PEER WIRELESS NETWORKS

PRIORITY CLAIM

The present Application for Patent is a Continuation of patent application Ser. No. 12/575,465 entitled "METHODS AND SYSTEMS FOR EXPLOITATION OF WELL-CONNECTED NODES IN PEER-TO-PEER WIRELESS NETWORKS" filed Oct. 7, 2009, pending, and assigned to the assignee hereof and hereby expressly incorporated by reference herein.

TECHNICAL FIELD

Certain embodiments of the present disclosure generally relate to wireless communications and, more particularly to a method for improving connectivity in peer-to-peer wireless networks.

BACKGROUND

A peer-to-peer (P2P) wireless network is designed to operate in a manner where all devices share a common wireless resource (i.e., spectrum) for both receive and transmit operations (i.e., time-division duplex scheme). A key objective of the P2P network is to facilitate discovery. i.e., the act of discovering devices in the radio frequency (RF) vicinity that a terminal can make a connection with (i.e., receive from and transmit to). The interconnection of P2P devices constitutes the network.

The discovery process generally requires P2P devices to periodically transmit an identifier (ID) probe message (possibly at pseudorandom times) intended to be received by other P2P devices in the RF vicinity. In general, a P2P device spends a majority of it's time listening for ID probes from other devices, and very small amount of time transmitting its own ID probe message.

An ID probe message typically includes various types of information, such as a unique ID of the device, a location of the device (if available), and a specific service advertised by the device. All P2P devices create and maintain a "discovery" database of other P2P devices in the RF vicinity. The discovery database then contains the information collected from the received ID probes.

The coverage around a specific node (i.e. device) in the P2P network is typically non-uniform and severely constrained compared to that of, for example, a macro-cell, a microcell or even a pico-cell. This is because many of the P2P devices are often buried in the local clutter and the propagation conditions can be highly variable, leading to large path-losses due to shadowing and building penetration losses. Because of the large degree of variability in the propagation, a device advertising a desired service may be discovered even if it is far away from a searching node (e.g., 1 km), while another device advertising the same desired service much closer to the searching node may not been discovered because of excessive path loss specific to the geometry and topology of the P2P network.

SUMMARY

Certain embodiments of the present disclosure provide a method for wireless communications by a wireless node in a peer-to-peer (P2P) wireless network. The method generally includes generating a connectivity metric (CM) value indicative of a number of other wireless nodes of the P2P wireless network to which the wireless node is connected, and transmitting the CM value.

Certain embodiments of the present disclosure provide a method for wireless communications by a wireless node in a peer-to-peer (P2P) wireless network. The method generally includes generating a connectivity metric (CM) value indicative of a number of other wireless nodes of the P2P wireless network to which the wireless node is connected, receiving a query for services, and responding to the query for services if the CM value is greater than a defined CM threshold value.

Certain embodiments of the present disclosure provide a method for wireless communications. The method generally includes receiving, from one or more wireless nodes of a peer-to-peer (P2P) wireless network, a connectivity metric (CM) value associated with each of the wireless nodes indicative of a number of wireless nodes in the P2P wireless network to which the wireless node is connected, and determining, based on the CM value, a time slot for reception of full connectivity information maintained by the wireless node.

Certain embodiments of the present disclosure provide a method for wireless communications. The method generally includes receiving, from one or more wireless nodes of a peer-to-peer (P2P) wireless network, a connectivity metric (CM) value associated with each of the wireless nodes indicative of a number of wireless nodes in the P2P wireless network to which the wireless node is connected, and transmitting a service query to the wireless node, if the received CM value exceeds a defined CM threshold value.

Certain embodiments of the present disclosure provide an apparatus for wireless communications by a wireless node in a peer-to-peer (P2P) wireless network. The apparatus generally includes logic for generating a connectivity metric (CM) value indicative of a number of other wireless nodes of the P2P wireless network to which the wireless node is connected, and logic for transmitting the CM value.

Certain embodiments of the present disclosure provide an apparatus for wireless communications by a wireless node in a peer-to-peer (P2P) wireless network. The apparatus generally includes logic for generating a connectivity metric (CM) value indicative of a number of other wireless nodes of the P2P wireless network to which the wireless node is connected, logic for receiving a query for services, and logic for responding to the query for services if the CM value is greater than a defined CM threshold value.

Certain embodiments of the present disclosure provide an apparatus for wireless communications. The apparatus generally includes logic for receiving, from one or more wireless nodes of a peer-to-peer (P2P) wireless network, a connectivity metric (CM) value associated with each of the wireless nodes indicative of a number of wireless nodes in the P2P wireless network to which the wireless node is connected, and logic for determining, based on the CM value, a time slot for reception of full connectivity information maintained by the wireless node.

Certain embodiments of the present disclosure provide an apparatus for wireless communications. The apparatus generally includes logic for receiving, from one or more wireless nodes of a peer-to-peer (P2P) wireless network, a connectivity metric (CM) value associated with each of the wireless nodes indicative of a number of wireless nodes in the P2P wireless network to which the wireless node is connected, and logic for transmitting a service query to the wireless node, if the received CM value exceeds a defined CM threshold value.

Certain embodiments of the present disclosure provide an apparatus for wireless communications by a wireless node in a peer-to-peer (P2P) wireless network. The apparatus generally includes means for generating a connectivity metric (CM) value indicative of a number of other wireless nodes of the P2P wireless network to which the wireless node is connected, and means for transmitting the CM value.

Certain embodiments of the present disclosure provide an apparatus for wireless communications by a wireless node in a peer-to-peer (P2P) wireless network. The apparatus generally includes means for generating a connectivity metric (CM) value indicative of a number of other wireless nodes of the P2P wireless network to which the wireless node is connected, means for receiving a query for services, and means for responding to the query for services if the CM value is greater than a defined CM threshold value.

Certain embodiments of the present disclosure provide an apparatus for wireless communications. The apparatus generally includes means for receiving, from one or more wireless nodes of a peer-to-peer (P2P) wireless network, a connectivity metric (CM) value associated with each of the wireless nodes indicative of a number of wireless nodes in the P2P wireless network to which the wireless node is connected, and means for determining, based on the CM value, a time slot for reception of full connectivity information maintained by the wireless node.

Certain embodiments of the present disclosure provide an apparatus for wireless communications. The apparatus generally includes means for receiving, from one or more wireless nodes of a peer-to-peer (P2P) wireless network, a connectivity metric (CM) value associated with each of the wireless nodes indicative of a number of wireless nodes in the P2P wireless network to which the wireless node is connected, and means for transmitting a service query to the wireless node, if the received CM value exceeds a defined CM threshold value.

Certain embodiments of the present disclosure provide a computer-program product for wireless communications by a wireless node in a peer-to-peer (P2P) wireless network, comprising a computer-readable medium having instructions stored thereon, the instructions being executable by one or more processors. The instructions generally include instructions for generating a connectivity metric (CM) value indicative of a number of other wireless nodes of the P2P wireless network to which the wireless node is connected, and instructions for transmitting the CM value.

Certain embodiments of the present disclosure provide a computer-program product for wireless communications by a wireless node in a peer-to-peer (P2P) wireless network, comprising a computer-readable medium having instructions stored thereon, the instructions being executable by one or more processors. The instructions generally include instructions for generating a connectivity metric (CM) value indicative of a number of other wireless nodes of the P2P wireless network to which the wireless node is connected, instructions for receiving a query for services, and instructions for responding to the query for services if the CM value is greater than a defined CM threshold value.

Certain embodiments of the present disclosure provide a computer-program product for wireless communications, comprising a computer-readable medium having instructions stored thereon, the instructions being executable by one or more processors. The instructions generally include instructions for receiving, from one or more wireless nodes of a peer-to-peer (P2P) wireless network, a connectivity metric (CM) value associated with each of the wireless nodes indicative of a number of wireless nodes in the P2P wireless network to which the wireless node is connected, and instructions for determining, based on the CM value, a time slot for reception of full connectivity information maintained by the wireless node.

Certain embodiments of the present disclosure provide a computer-program product for wireless communications, comprising a computer-readable medium having instructions stored thereon, the instructions being executable by one or more processors. The instructions generally include instructions for receiving, from one or more wireless nodes of a peer-to-peer (P2P) wireless network, a connectivity metric (CM) value associated with each of the wireless nodes indicative of a number of wireless nodes in the P2P wireless network to which the wireless node is connected, and instructions for transmitting a service query to the wireless node, if the received CM value exceeds a defined CM threshold value.

BRIEF DESCRIPTION OF THE DRAWINGS

So that the manner in which the above-recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

DETAILED DESCRIPTION

Figure 1:
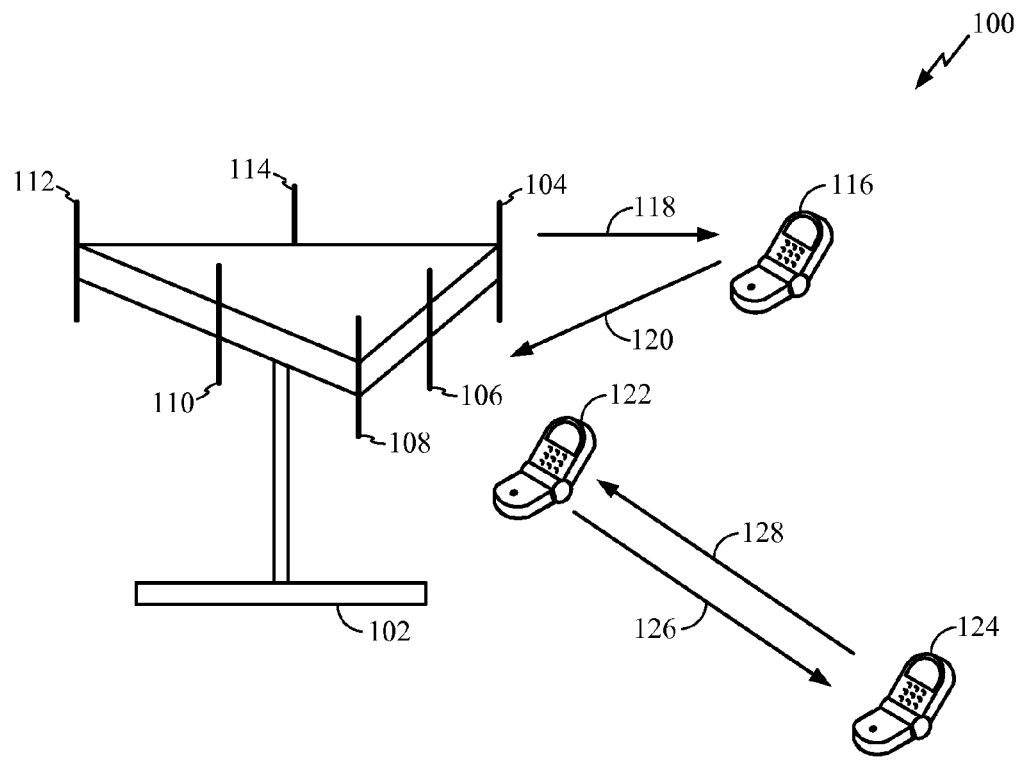
FIG. 1 illustrates an example wireless communication system in accordance with certain embodiments of the present disclosure.

Various embodiments of the disclosure are described more fully hereinafter with reference to the accompanying drawings. This disclosure may, however, be embodied in many different forms and should not be construed as limited to any specific structure or function presented throughout this disclosure. Rather, these embodiments are provided so that this disclosure will be thorough and complete, and will fully convey the scope of the disclosure to those skilled in the art. Based on the teachings herein one skilled in the art should appreciate that the scope of the disclosure is intended to cover any embodiment of the disclosure disclosed herein, whether implemented independently of or combined with any other embodiment of the disclosure. For example, an apparatus may be implemented or a method may be practiced using any number of the embodiments set forth herein. In addition, the scope of the disclosure is intended to cover such an apparatus or method which is practiced using other structure, functionality, or structure and functionality in addition to or other than the various embodiments of the disclosure set forth herein. It should be understood that any embodiment of the disclosure disclosed herein may be embodied by one or more elements of a claim.

The word "exemplary" is used herein to mean 'serving as an example, instance, or illustration.' Any embodiment described herein as "exemplary" is not necessarily to be construed as preferred or advantageous over other embodiments.

Although particular embodiments are described herein, many variations and permutations of these embodiments fall within the scope of the disclosure. Although some benefits and advantages of the preferred embodiments are mentioned, the scope of the disclosure is not intended to be limited to particular benefits, uses, or objectives. Rather, embodiments of the disclosure are intended to be broadly applicable to different wireless technologies, system configurations, networks, and transmission protocols, some of which are illustrated by way of example in the figures and in the following description of the preferred embodiments. The detailed description and drawings are merely illustrative of the disclosure rather than limiting, the scope of the disclosure being defined by the appended claims and equivalents thereof The techniques described herein may be used for various broadband wireless communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

Exemplary Wireless Communication System

Referring now to FIG. 1, illustrated is a wireless communication system 100 in accordance with various embodiments of the present disclosure. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, and so forth), as will be appreciated by one skilled in the art. Additionally, base station 102 can be a home base station, a Femto base station, and/or the like.

Base station 102 can communicate with one or more devices such as device 116; however, it is to be appreciated that base station 102 can communicate with substantially any number of devices similar to device 116. As depicted, device 116 is in communication with antennas 104 and 106, where antennas 104 and 106 transmit information to device 116 over a forward link 118 and receive information from device 116 over a reverse link 120. In a frequency division duplex (FDD) system, forward link 118 can utilize a different frequency band than that used by reverse link 120, for example. Further, in a time division duplex (TDD) system, forward link 118 and reverse link 120 can utilize a common frequency band.

In addition, devices 122 and 124 can be communicating with one another, such as in a peer-to-peer configuration. Moreover, device 122 is in communication with device 124 using links 126 and 128. In a peer-to-peer ad hoc network, devices within range of each other, such as devices 122 and 124, communicate directly with each other without a base station 102 and/or a wired infrastructure to relay their communication. Additionally, peer devices or nodes can relay traffic. The devices within the network communicating in a peer-to-peer manner can function similar to base stations and relay traffic or communications to other devices, functioning similar to base stations, until the traffic reaches its ultimate destination. The devices can also transmit control channels, which carry information that can be utilized to manage the data transmission between peer nodes.

A communication network can include any number of devices or nodes that are in wireless (or wired) communication. Each node can be within range of one or more other nodes and can communicate with the other nodes or through utilization of the other nodes, such as in a multi-hop topography (e.g., communications can hop from node to node until reaching a final destination). For example, a sender node may wish to communicate with a receiver node. To enable packet transfer between sender node and receiver node, one or more intermediate nodes can be utilized. It should be understood that any node can be a sender node and/or a receiver node and can perform functions of either sending and/or receiving information at substantially the same time (e.g., can broadcast or communicate information at about the same time as receiving information) or at different times.

System 100 can be configured to allow nodes that have initiated a communication session over a network to move the session to a direct connection. Nodes that are directly connected can exchange packets natively without any encapsulation. In accordance with some embodiments, a "homeless" node can switch to a wireless network without losing its ongoing sessions. By "homeless" it is meant a node that does not have any home agent entity to provide assistance for keeping ongoing sessions alive while switching to foreign networks nor to forward any new incoming request(s) to establish new sessions to the node's current location. In accordance with some embodiments, nodes can be mobile (e.g., wireless), static (e.g., wired), or combinations thereof (e.g., one node static and a second node mobile, both nodes mobile, and so forth).

Figure 2:
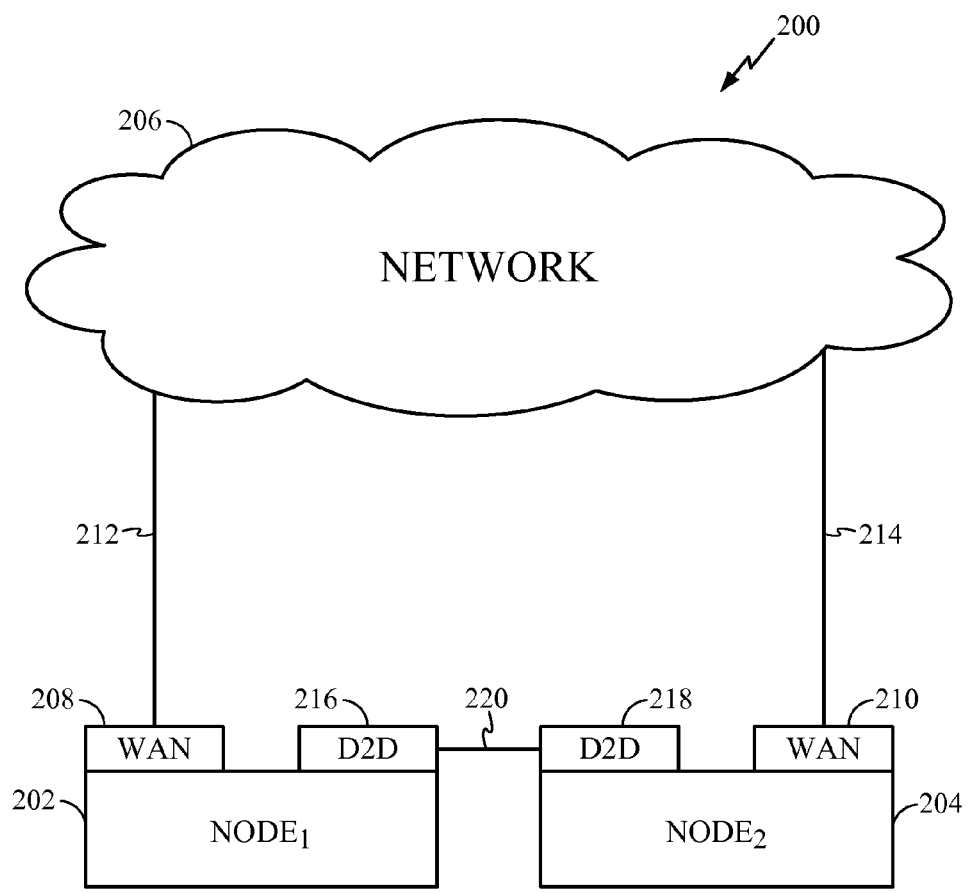
FIG. 2 illustrates a system that allows two nodes to communicate in accordance with certain embodiments of the present disclosure.

FIG. 2 illustrates a system 200 that allows two nodes to communicate over a Wide Area Network interface and/or a Device to Device interface, according to various embodiments. Included in system 200 are a first node (Node1) 202 and a second node (Node2) 204. Each node 202, 204 includes at least two interfaces. A first interface can be connected to a network 206 that provides Internet Protocol (IP) addresses. For example, the network can be a Wide Area Network (WAN), a Local Area Network (LAN), a home network, Digital Subscriber Line (DSL), cable, 3GPP based, 3GPP2 based, WiMAX based, WLAN based, or any other technology providing interconnectivity and routing to a network of interest (e.g., the Internet).

Interfaces of nodes 202 and 204 can be wired (e.g., Device to Device), wireless (e.g., WAN), or combinations thereof For example, Node1 202 interface can be wireless and Node2 204 interface can be wired, or Node2 204 interface can be wireless and Node1 202 interface can be wired, both interfaces 202 and 204 can be wireless, or both interfaces 202 and 204 can be wired.

For illustration purposes, the first interface of each node 202, 204 is a WAN interface, 208 and 210. WAN interfaces 208, 210 provide a connection over network 206, illustrated by links 212 and 214. Further, each node 202, 204 includes at least a second interface that is connected to a local network with directly connected peers or a multi-hop mesh network. For example, the local network can be a Wireless Local Area Network (WLAN) or another device to device (e.g., peer to peer) technology. For illustration purposes, the second interface of each node 202, 204 is illustrated as a Device to Device (D2D) interface 216, 218. The D2D interfaces 216, 218 allow nodes 202, 204 to perform direct communications, illustrated by direct link 220.

A procedure according to various embodiments for starting a session over network 206 and moving to a direct session (e.g., over direct link 220) will now be described. For example purposes, it is assumed that node1 202 utilizes Mobile Internet Protocol. Communications are performed by node1 202 utilizing its Mobile IP home address as a source address. A home address is a unicast routable address assigned to a node and is used as the permanent address of the node. Node1 202 communicates with node2 204 over network 206 (e.g., WAN) by sending and receiving packets over respective first interfaces (e.g., WAN interfaces 208, 210). The packets can be encapsulated in a MIPv6 tunnel to a home agent, which can be included in network 206 according to various embodiments, or a route optimization tunnel directly to node2 204.

Figure 3:
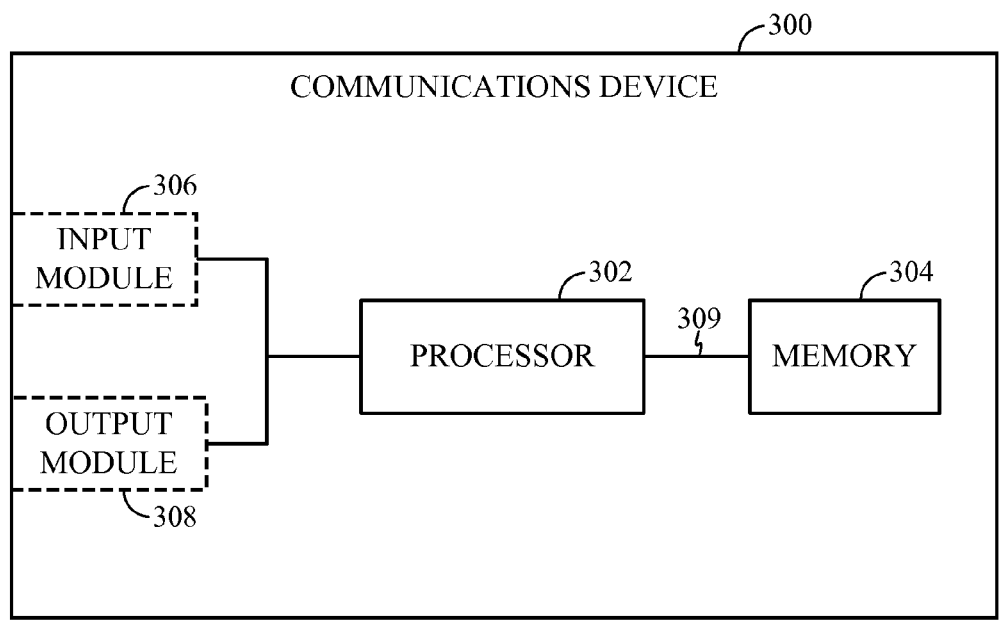
FIG. 3 illustrates an example of a communication device in accordance with certain embodiments of the present disclosure.

FIG. 3 illustrates an exemplary first communications device 300, in accordance with an exemplary embodiment. Exemplary first communications device 300 is, e.g., one of the wireless communications devices (102, 116, 122, 124) of FIG. 1 or one of the wireless communications devices (202, 204) of FIG. 2.

First communications device 300 includes a processor 302 and memory 304 coupled together via a bus 309 over which the various elements (302, 304) may interchange data and information. Communications device 300 further includes an input module 306 and an output module 308 which may be coupled to processor 302 as shown. However, in some embodiments, the input module 306 and output module 308 are located internal to the processor 302. Input module 306 can receive input signals. Input module 306 can, and in some embodiments does, include a wireless receiver and/or a wired or optical input interface for receiving input. Output module 308 may include, and in some embodiments does include, a wireless transmitter and/or a wired or optical output interface for transmitting output.

Processor 302 is configured to: receive a first signal from a second communications device; generate a first application alert if said first signal satisfies an application alert criteria; and receive a second signal from an access point said second signal carrying second communications device information based on a previous signal from the second communications device. The access point may be, and sometimes is, a base station. In some embodiments, the second communications device information is location information. In various embodiments, processor 302 is configured to receive said first signal via a wireless peer to peer interface as part of being configured to receive a first signal. In some embodiments, processor 302 is configured to receive the second signal via a wireless wide area network interface as part of being configured to receive the second signal.

Processor 302 is further configured to determine an operation to take based on the second communications device information included in the second signal and information included in said first signal. In one exemplary embodiment, said second communications device information included in the second signal is information on a previous location of said second communications device, said information included in the first signal is current location information, and said operation is one of a location based traffic update operation and a location based advertisement update operation. Processor 302, in some embodiments, is further configured to send an information request signal to the access point requesting information corresponding to the second communications device, in response to the generated first application alert.

Information collected by a given node of a peer-to-peer (P2P) network, such as the network 100 from FIG. 1 and/or the network 206 from FIG. 2, may be efficiently shared with other nodes directly connected to it. The sharing of connectivity information among connected nodes may increase the effective coverage of the given node. In many real world deployments, there may be some nodes that are better connected than others. These "well-connected" nodes can play an important role in P2P wireless networks by virtue of their advantageous position in the networks.

Therefore, it is desirable to devise a scheme in which these "well-connected" nodes can be exploited in a manner that increases the overall connectivity of all the nodes in the P2P network.

Exemplary Exploitation of Well-Connected Nodes in P2P Wireless Networks

Certain embodiments of the present disclosure provide a discovery protocol in which nodes of a P2P network broadcast, possibly as a part of their generic identifier (ID) probe message, a metric which is indicative of a number of distinct nodes to which they may be connected. This "connectivity metric" (CM) may then be used by other nodes to aid in their discovery of other nodes (and services) in the network. That is, by providing knowledge of each node's CM, a given node may selectively choose which nodes may be better candidates to listen to (thereby saving power) or to query (thereby reducing broadcast queries, subsequent responses, and conserving overall bandwidth).

Nodes with higher CM values (indicating connections with a relatively high number of other nodes) may represent better opportunities to discover services than those with lower CM values. In a P2P network that enjoys common timing (e.g., as provided by a common clock distributed via global positioning system (GPS) or via wide area network (WAN)), the transmissions of nodes may be slotted for efficiency purposes.

Furthermore, there may be different types of surrogate advertised service messages where full disclosure of connectivity information maintained by a given node may occur infrequently, and where partial disclosure may occur more frequently. Since a well-connected node may be required to send a longer message than less well-connected nodes when transmitting full disclosure information, in order to minimize the transmission burden on the well-connected node, the transmit slot cycle (i.e. the periodicity and slot index) may be used infrequently.

In order for other nodes to benefit when well connected nodes broadcast their full connectivity information, these nodes may need to know when to listen for the broadcasts. Because of that, it is desirable to know which nodes may have the most information to share, and when these nodes will transmit their full connectivity information. Thus, indication about a given node's transmit slot cycle index along with the CM value may be beneficial. An algorithm allowing other nodes to compute the given node's transmit slot cycle from the CM value and possibly other information, such as an electronic serial number (ESN) and a mobile identification number (MIN), may also be beneficial. This may allow the other nodes to minimize power consumption caused by keeping their receivers on for extended periods of time. For example, these nodes may refrain from listening to the full connectivity information until the determined time slot. This approach may also minimize the potential for queries being generated by the given node since the connectivity information may be more efficiently made available through the well connected nodes.

Even in the event that full disclosure of node connectivity information is not facilitated by the system design via some broadcast message, the CM values of nodes may still help govern the queries and responses of nodes in the P2P network. In a system supporting directed queries (i.e., a query directed at a single node), received CM values associated with connected nodes may help a receiving node decide which node(s) to query. That is, the higher the CM value, the higher the probability the node may have knowledge of a specific service being sought. Therefore, the CM values may be directly proportional to the rank assigned by the node launching directed queries at the connected nodes. A directed query may be, for example, first transmitted to a wireless node with a highest CM value among the CM values of the connected nodes. This may have the potential to reduce the amount of query-based traffic each node generates. Furthermore, since nodes with higher CM values may be more likely to respond to directed queries, the query response message may be designed to benefit the other nodes receiving it.

In the case where targeted queries are utilized (e.g., multi-cast queries to a group of nodes sharing a common attribute), the CM value may be utilized to help govern the response of the nodes that are queried. For example, according to certain embodiments, the query message may contain a predefined CM threshold used by nodes in deciding whether they should respond to the query or not. Therefore, if a node's CM value is above the specified threshold, the node may be qualified to respond, otherwise the node may not respond to the query.

Furthermore, an absolute value of the difference between the node's CM value and the CM threshold value may be used to determine the timing of a given response. For example, the larger the difference (meaning a higher CM value), the greater the probability might be of a response in an earlier time slot. Conversely, the smaller the difference, the greater may be the probability that the response will be delayed to allow for higher CM scored nodes to respond. In addition, those nodes qualified to respond to a common received service query or to a query for the same service previously transmitted from another wireless node may attempt to read the query response of the actively transmitting node, examine the contents, and determine if their response would be redundant or not. This way, wasteful redundancy may be reduced and the random access wireless medium may be made available sooner for other nodes.

Figure 4:
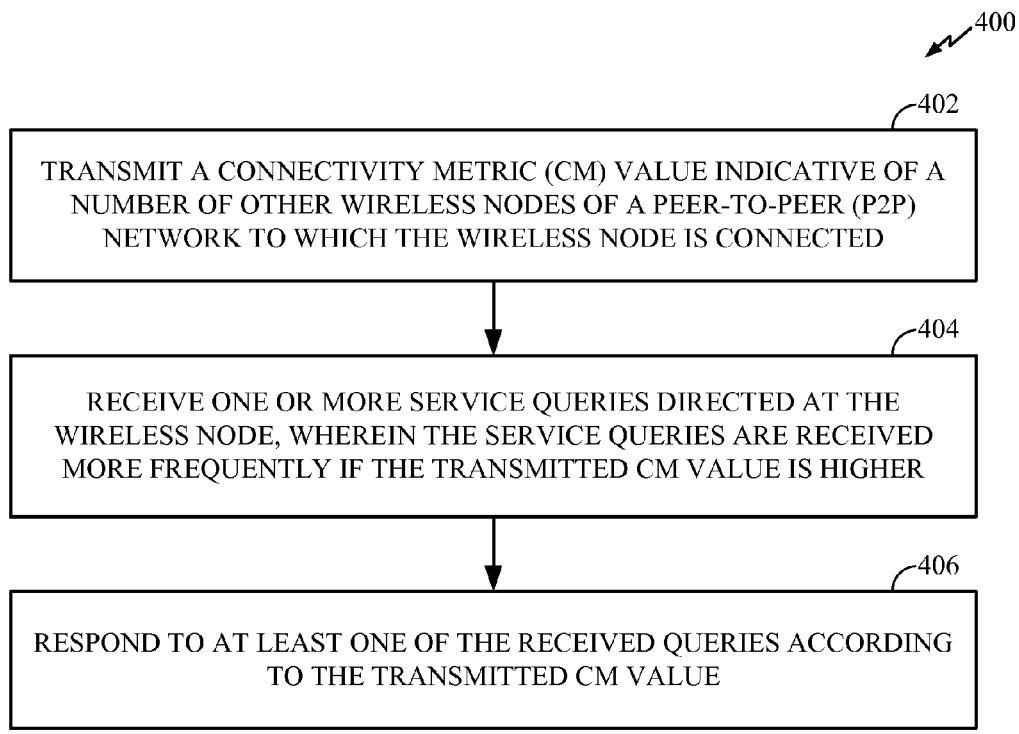
FIG. 4 illustrates example operations for sharing connectivity information in a peer-to-peer (P2P) wireless network in accordance with certain embodiments of the present disclosure.

FIG. 4 illustrates example operations 400 for sharing connectivity information in a P2P wireless network. The operations 400 may be performed, for example, by wireless nodes of the P2P network, to share associated connectivity information in accordance with certain embodiments of the present disclosure.

At 402, a connectivity metric (CM) value associated with the wireless node may be transmitted. At 404, one or more service queries directed at the wireless node may be received, wherein the queries may be received more frequently if the transmitted CM value is higher, and vice-versa. At 406, the wireless node may respond to at least one of the received queries according to the transmitted CM value.

Figure 5:
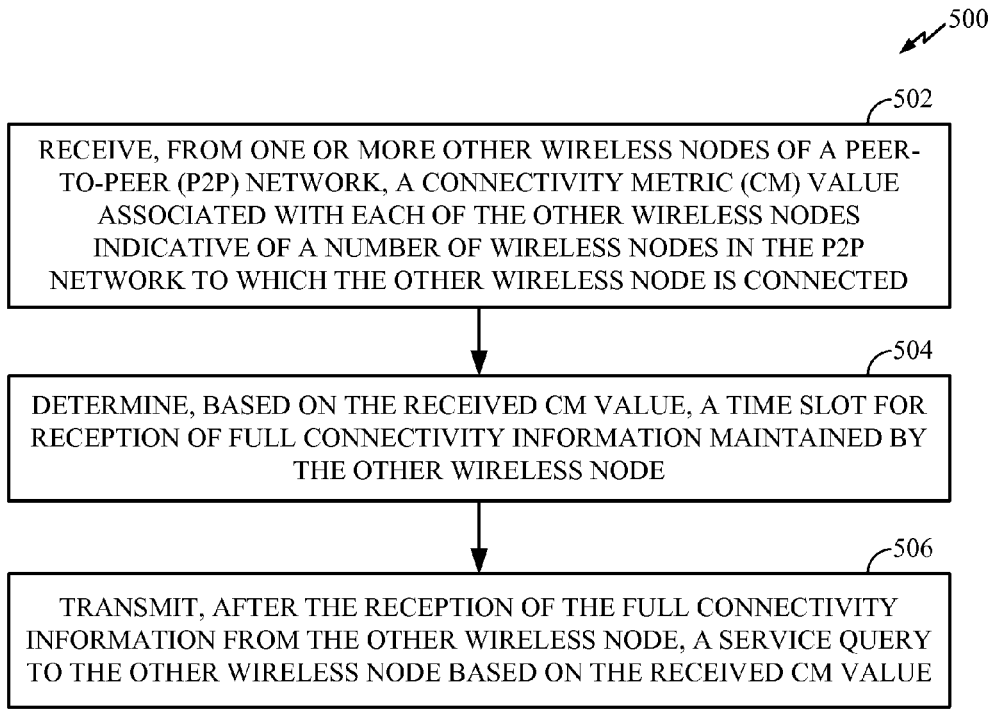
FIG. 5 illustrates example operations for processing connectivity information received from wireless nodes of the P2P network in accordance with certain embodiments of the present disclosure.

FIG. 5 illustrates example operations 500 for processing connectivity information in a P2P wireless network. The operations 500 may be performed, for example, by a wireless node receiving connectivity information from other wireless nodes of the P2P network in accordance with certain embodiments of the present disclosure.

At 502, the wireless node may receive, from one or more other wireless nodes of the P2P network, a CM value associated with each of the other wireless nodes. At 504, a time slot may be determined at the wireless node for reception of full connectivity information maintained by the other wireless node. After the reception of the full connectivity information transmitted from the other wireless node, a service query may be transmitted, at 506, to the other wireless node based on the received CM value.

Figure 4A:
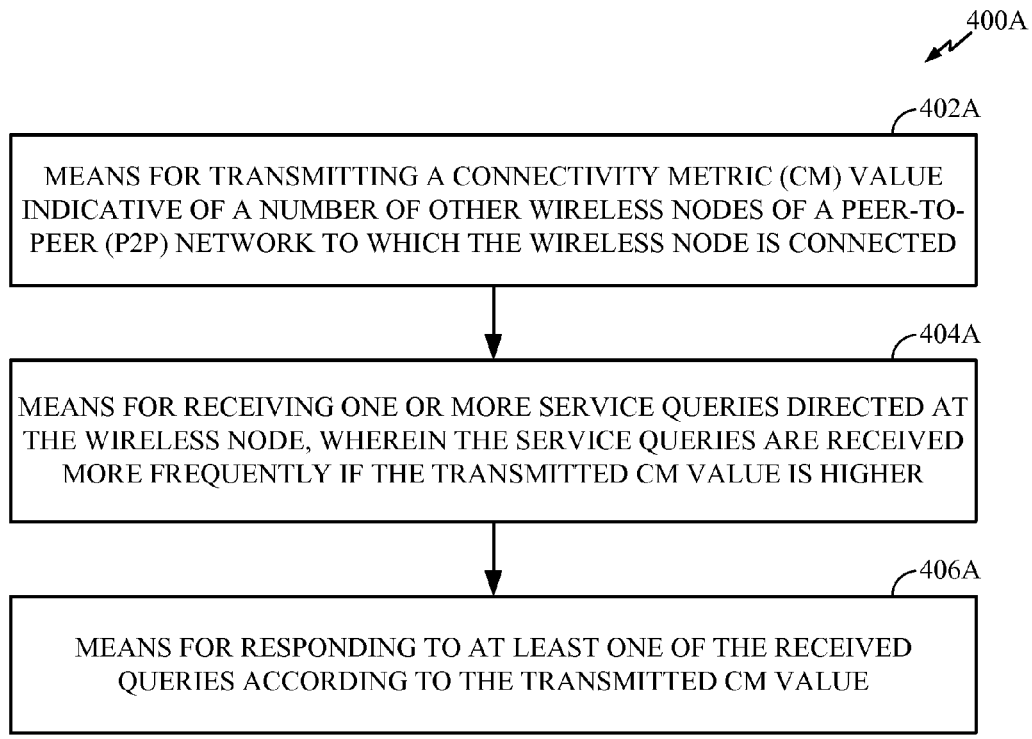
FIG. 4A illustrates example components capable of performing the operations illustrated in FIG. 4.
Figure 5A:
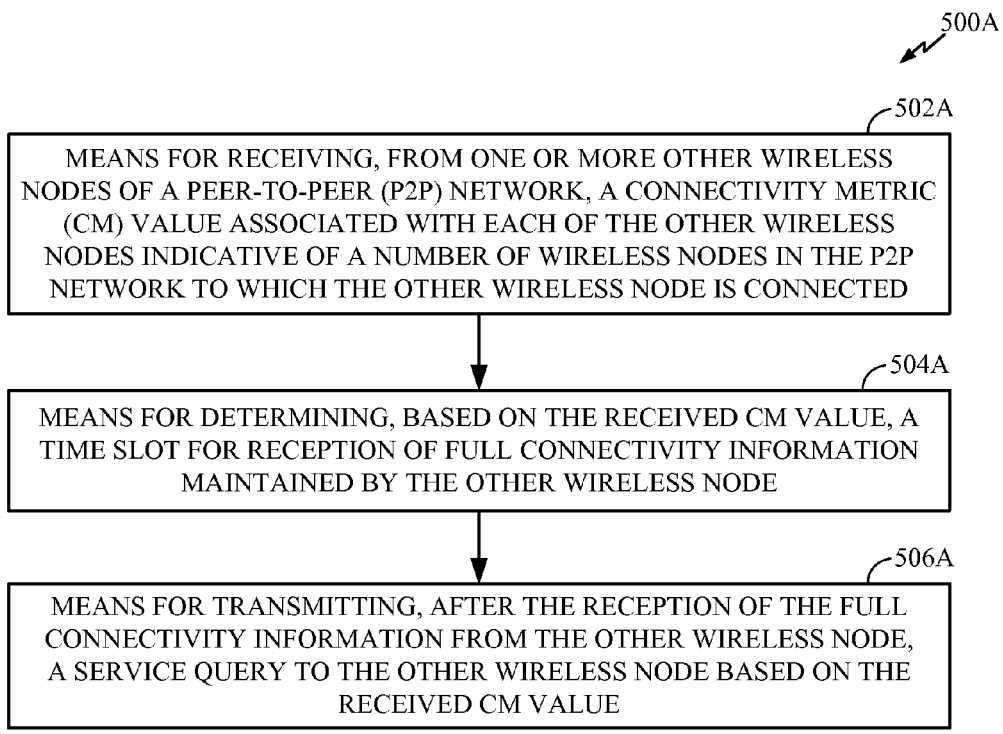
FIG. 5A illustrates example components capable of performing the operations illustrated in FIG. 5.

The various operations of methods described above may be performed by various hardware and/or software component(s) and/or module(s) corresponding to means-plus-function blocks illustrated in the Figures. For example, blocks 402-406 illustrated in FIG. 4 correspond to means-plus-function blocks 402A-406A illustrated in FIG. 4A. Similarly, blocks 502-506 illustrated in FIG. 5 correspond to means-plus-function blocks 502A-506A illustrated in FIG. 5A. More generally, where there are methods illustrated in Figures having corresponding counterpart means-plus-function Figures, the operation blocks correspond to means-plus-function blocks with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray™ disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to embodiments of the present disclosure, other and further embodiments of the disclosure may be devised without departing from the basic scope thereof, and the scope thereof is determined by the claims that follow.

What is claimed is:

1. A method for wireless communications by a wireless node in a peer-to-peer (P2P) wireless network, comprising:
    generating a connectivity metric (CM) value indicating a number of all other wireless nodes of the P2P wireless network to which the wireless node is connected;
    transmitting the CM value;
    transmitting full connectivity information maintained by the wireless node at a frequency determined based on the CM value,
        the full connectivity information comprising full disclosure of received CM values associated with all other wireless nodes of the P2P wireless network to which the wireless node is connected, and
        the full connectivity information having a length proportional to the number of all other wireless nodes of the P2P wireless network to which the wireless node is connected;
    transmitting an indication concerning a transmit slot cycle index of the wireless node that indicates when the wireless node will transmit the full connectivity information, wherein the wireless node uses the transmit slot cycle index less frequently with respect to another wireless node based on its CM value being higher than that of the other wireless node; and
    receiving, from another wireless node, a query that is transmitted based on a rank assigned to the wireless node;
    wherein the other wireless node, based on its received CM values, generates a first query to a wireless node with the highest CM value.

2. The method of claim 1, wherein the CM value is transmitted as a part of a broadcast identifier (ID) probe message.

3. A method for wireless communications, comprising:
    receiving, from a wireless node of a peer-to-peer (P2P) wireless network, a connectivity metric (CM) value, associated with the wireless node, indicating a number of all other wireless nodes in the P2P wireless network to which the wireless node is connected and an indication concerning a transmit slot cycle index from the wireless node that indicates when the wireless node will transmit full connectivity information, wherein the wireless node uses the transmit slot cycle index less frequently with respect to another wireless node based on its CM value being higher than that of the other wireless node;
    determining, based on at least the CM value, a time slot for reception of the full connectivity information maintained by the wireless node,
        the full connectivity information comprising full disclosure of received CM values associated with all other wireless nodes of the P2P wireless network to which the wireless node is connected, and
        the full connectivity information having a length proportional to the number of all other wireless nodes of the P2P wireless network to which the wireless node is connected; and
    receiving, from another wireless node, a query that is transmitted based on a rank assigned to the wireless node;
    wherein the other wireless node, based on its received CM values, generates a first query to a wireless node with the highest CM value.

4. The method of claim 3, further comprising:
refraining from listening to the full connectivity information until the determined time slot.

5. The method of claim 3, further comprising:
transmitting, after the reception of the full connectivity information from the wireless node, a service query to the wireless node based on the CM value.

6. An apparatus for wireless communications by a wireless node in a peer-to-peer (P2P) wireless network, comprising:
logic for generating a connectivity metric (CM) value indicating a number of other wireless nodes of the P2P wireless network to which the wireless node is connected;
logic for transmitting the CM value;
logic for transmitting full connectivity information maintained by the wireless node at a frequency determined based on the CM value,
the full connectivity information comprising full disclosure of received CM values associated with the other wireless nodes of the P2P wireless network to which the wireless node is connected, and
the full connectivity information having a length proportional to the number of other wireless nodes of the P2P wireless network to which the wireless node is connected;
logic for transmitting an indication concerning a transmit slot cycle index of the wireless node that indicates when the wireless node will transmit the full connectivity information, wherein the wireless node uses the transmit slot cycle index less frequently with respect to another wireless based on its CM value being higher than that of the other wireless node; and
logic for receiving, from another wireless node, a query that is transmitted based on a rank assigned to the wireless node;
wherein the other wireless node, based on its received CM values, generates a first query to a wireless node with the highest CM value.

7. The apparatus of claim 6, wherein the CM value is transmitted as a part of a broadcast identifier (ID) probe message.

8. An apparatus for wireless communications, comprising:
logic for receiving, from a wireless node of a peer-to-peer (P2P) wireless network, a connectivity metric (CM) value, associated with the wireless node, indicating a number of other wireless nodes in the P2P wireless network to which the wireless node is connected and a transmit slot cycle index from the wireless node that indicates when the wireless node will transmit full connectivity information, wherein the wireless node uses the transmit slot cycle index less frequently with respect to another wireless node based on its CM value being higher than that of the other wireless node;
logic for determining, based on at least the CM value, a time slot for reception of the full connectivity information maintained by the wireless node,
the full connectivity information comprising full disclosure of received CM values associated with the other wireless nodes of the P2P wireless network to which the wireless node is connected, and
the full connectivity information having a length proportional to the number of other wireless nodes of the P2P wireless network to which the wireless node is connected; and
logic for receiving, from another wireless node, a query that is transmitted based on a rank assigned to the wireless node;
wherein the other wireless node, based on its received CM values, generates a first query to a wireless node with the highest CM value.

9. The apparatus of claim 8, further comprising:
logic for transmitting, after the reception of the full connectivity information from the wireless node, a service query to the wireless node based on the CM value.

10. An apparatus for wireless communications by a wireless node in a peer-to-peer (P2P) wireless network, comprising:
means for generating a connectivity metric (CM) value indicating a number of other wireless nodes of the P2P wireless network to which the wireless node is connected;
means for transmitting the CM value;
means for transmitting full connectivity information maintained by the wireless node at a frequency determined based on the CM value,
the full connectivity information comprising full disclosure of received CM values associated with the other wireless nodes of the P2P wireless network to which the wireless node is connected, and
the full connectivity information having a length proportional to the number of other wireless nodes of the P2P wireless network to which the wireless node is connected; and
means for transmitting an indication concerning a transmit slot cycle index of the wireless node that indicates when the wireless node will transmit the full connectivity information, wherein the wireless node, uses the transmit slot cycle index less frequently with respect to another wireless node based on its CM value being higher than that of the other wireless node; and
means for receiving, from another wireless node, a query that is transmitted based on a rank assigned to the wireless node;
wherein the other wireless node, based on its received CM values, generates a first query to a wireless node with the highest CM value.

11. The apparatus of claim 10, wherein the CM value is transmitted as a part of a broadcast identifier (ID) probe message.

12. An apparatus for wireless communications, comprising:
means for receiving, from a wireless node of a peer-to-peer (P2P) wireless network, a connectivity metric (CM) value, associated with the wireless node, indicating a number of other wireless nodes in the P2P wireless network to which the wireless node is connected and a transmit slot cycle index from the wireless node that indicates when the wireless node will transmit full connectivity information, wherein the wireless node uses the transmit slot cycle index less frequently with respect to another wireless node based on its CM value being higher than that of the other wireless node;
means for determining, based on at least the CM value, a time slot for reception of the full connectivity information maintained by the wireless node,
the full connectivity information comprising full disclosure of received CM values associated with the other wireless nodes of the P2P wireless network to which the wireless node is connected, and the full connectivity information having a length proportional to the number of other wireless nodes of the P2P wireless network to which the wireless node is connected; and means for receiving, from another wireless node, a query that is transmitted based on a rank assigned to the wireless node;

wherein the other wireless node, based on its received CM values, generates a first query to a wireless node with the highest CM value.

13. The apparatus of claim 12, further comprising:
means for refraining from listening to the full connectivity information until the determined time slot.

14. The apparatus of claim 12, further comprising:
means for transmitting, after the reception of the full connectivity information from the wireless node, a service query to the wireless node based on the CM value.

15. A computer-program product for wireless communications by a wireless node in a peer-to-peer (P2P) wireless network, comprising a non-transitory computer-readable medium having instructions stored thereon, the instructions being executable by one or more processors and the instructions comprising:

instructions for generating a connectivity metric (CM) value indicating a number of other wireless nodes of the P2P wireless network to which the wireless node is connected;

instructions for transmitting the CM value;

instructions for transmitting full connectivity information maintained by the wireless node at a frequency determined based on the CM value, the full connectivity information comprising full disclosure of received CM values associated with the other wireless nodes of the P2P wireless network to which the wireless node is connected, and the full connectivity information having a length proportional to the number of other wireless nodes of the P2P wireless network to which the wireless node is connected; and instructions for transmitting an indication concerning a transmit slot cycle index of the wireless node that indicates when the wireless node will transmit the full connectivity information, wherein the wireless node uses the transmit slot cycle index less frequently with respect to another wireless node based on its CM value being higher than that of the other wireless node; and instructions for receiving, from another wireless node, a query that is transmitted based on a rank assigned to the wireless node;

wherein the other wireless node, based on its received CM values, generates a first query to a wireless node with the highest CM value.

16. The computer-program product of claim 15, wherein the CM value is transmitted as a part of a broadcast identifier (ID) probe message.

17. A computer-program product for wireless communications, comprising a non-transitory computer-readable medium having instructions stored thereon, the instructions being executable by one or more processors and the instructions comprising:

instructions for receiving, from a wireless node of a peer-to-peer (P2P) wireless network, a connectivity metric (CM) value, associated with the wireless node, indicating a number of other wireless nodes in the P2P wireless network to which the wireless node is connected and a transmit slot cycle index from the wireless node that indicates when the wireless node will transmit full connectivity information, wherein the wireless node uses the transmit slot cycle index less frequently with respect to another wireless node based on its CM value being higher than that of the other wireless node;

instructions for determining, based on at least the CM value, a time slot for reception of the full connectivity information maintained by the wireless node, the full connectivity information comprising full disclosure of received CM values associated with the other wireless nodes of the P2P wireless network to which the wireless node is connected, and the full connectivity information having a length proportional to the number of other wireless nodes of the P2P wireless network to which the wireless node is connected; and instructions for receiving, from another wireless node, a query that is transmitted based on a rank assigned to said wireless node;

wherein said other wireless node, based on its received CM values, generates a first query to a wireless node with the highest CM value.

18. The computer-program product of claim 17, wherein the instructions further comprise:
instructions for refraining from listening to the full connectivity information until the determined time slot.

19. The computer-program product of claim 17, wherein the instructions further comprise:
instructions for transmitting, after the reception of the full connectivity information from the wireless node, a service query to the wireless node based on the CM value.

* * * * *